US012621407B2

(12) United States Patent
Wang et al.

(10) Patent No.:     US 12,621,407 B2
(45) Date of Patent:         May 5, 2026

(54) SYSTEMS AND METHODS FOR CAMERA SYNCHRONIZATION

(71) Applicant: ZHEJIANG HUARAY TECHNOLOGY CO., LTD., Hangzhou (CN)

(72) Inventors: Zongmiao Wang, Hangzhou (CN); Weiping Shi, Hangzhou (CN); Yanfei Lyu, Hangzhou (CN)

(73) Assignee: ZHEJIANG HUARAY TECHNOLOGY CO., LTD., Hangzhou (CN)

( * ) Notice: Subject to any disclaimer, the term of this patent is extended or adjusted under 35 U.S.C. 154(b) by 257 days.

(21) Appl. No.: 18/406,267

(22) Filed: Jan. 8, 2024

(65) Prior Publication Data

US 2024/0146870 A1     May 2, 2024

Related U.S. Application Data

(63) Continuation of application No. PCT/CN2022/104126, filed on Jul. 6, 2022.

(30) Foreign Application Priority Data

Jul. 8, 2021    (CN) .......................... 202110769848.0

(51) Int. Cl.
*H04N 7/035* (2006.01)
*H04N 23/661* (2023.01)
(52) U.S. Cl.
CPC ........... *H04N 7/035* (2013.01); *H04N 23/661* (2023.01)

(58) Field of Classification Search
CPC ................. H04N 7/035; H04N 23/661; H04N 21/21805; H04N 21/242; H04N 21/4223;
(Continued)

(56) References Cited

U.S. PATENT DOCUMENTS

| 2002/0135682 A1 | 9/2002 | Oka et al. | |
| 2007/0296617 A1* | 12/2007 | Murata | ..................... G06F 5/06 |
| | | | 341/101 |

(Continued)

FOREIGN PATENT DOCUMENTS

| CN | 102404105 A | 4/2012 |
| CN | 107231533 A | 10/2017 |

(Continued)

OTHER PUBLICATIONS

The Extended European Search Report in European Application No. 22836952.6 mailed on Sep. 18, 2024, 7 pages.
(Continued)

*Primary Examiner* — Shahbaz Nazrul
(74) *Attorney, Agent, or Firm* — METIS IP LLC

(57) ABSTRACT

The present disclosure may relate to systems and methods for camera synchronization. A method may include determining a frequency difference between a first frequency of a first camera and a second frequency of a second camera. The method may also include synchronizing the second frequency of the second camera to the first frequency of the first camera based on the frequency difference. The method may further include directing the first camera and the second camera to execute camera operations under synchronized frequency.

18 Claims, 12 Drawing Sheets

<u>100</u>

(58) Field of Classification Search

CPC ........ H04N 7/56; H04N 23/90; H04N 5/0733;
H04J 3/0661

See application file for complete search history.

(56) References Cited

U.S. PATENT DOCUMENTS

| | | | |
|---|---|---|---|
| 2011/0019699 A1 | 1/2011 | Sun et al. | |
| 2012/0249806 A1* | 10/2012 | Gong | H04N 23/63 |
| | | | 348/E5.045 |
| 2012/0257045 A1* | 10/2012 | Ockerse | B60R 1/25 |
| | | | 348/135 |
| 2015/0163003 A1* | 6/2015 | Takahashi | H04N 21/242 |
| | | | 370/509 |
| 2016/0088209 A1 | 3/2016 | Tanaka et al. | |
| 2016/0261807 A1 | 9/2016 | Seshadrinathan et al. | |
| 2019/0052276 A1 | 2/2019 | Xiu | |
| 2019/0289172 A1 | 9/2019 | Bangs et al. | |
| 2020/0396392 A1 | 12/2020 | Griswold | |
| 2021/0227101 A1 | 7/2021 | Cui et al. | |

FOREIGN PATENT DOCUMENTS

| | | | |
|---|---|---|---|
| CN | 109586691 | A | 4/2019 |
| CN | 110567453 | A | 12/2019 |
| CN | 110996011 | A | 4/2020 |
| CN | 111130676 | A | 5/2020 |
| CN | 111556226 | A | 8/2020 |
| CN | 212013044 | U | 11/2020 |
| CN | 113055117 | A | 6/2021 |
| JP | 2000138660 | A | 5/2000 |
| WO | 2023280206 | A1 | 1/2023 |

OTHER PUBLICATIONS

Notice of Rejection in Japanese Application No. 2024-500378 mailed on Feb. 18, 2025, 7 pages.

International Search Report in PCT/CN2022/104126 mailed on Oct. 8, 2022, 4 pages.

Written Opinion in PCT/CN2022/104126 mailed on Oct. 8, 2022, 5 pages.

First Office Action in Chinese Application No. 202110769848.0 mailed on Aug. 16, 2021, 12 pages.

* cited by examiner

100

110

120

130

Storage
Device

<u>400</u>

Frequency Determination Module
<u>410</u>

Frequency Synchronization Module
<u>420</u>

Trigger Module
<u>430</u>

Time Determination Module
<u>440</u>

Time Synchronization Module
<u>450</u>

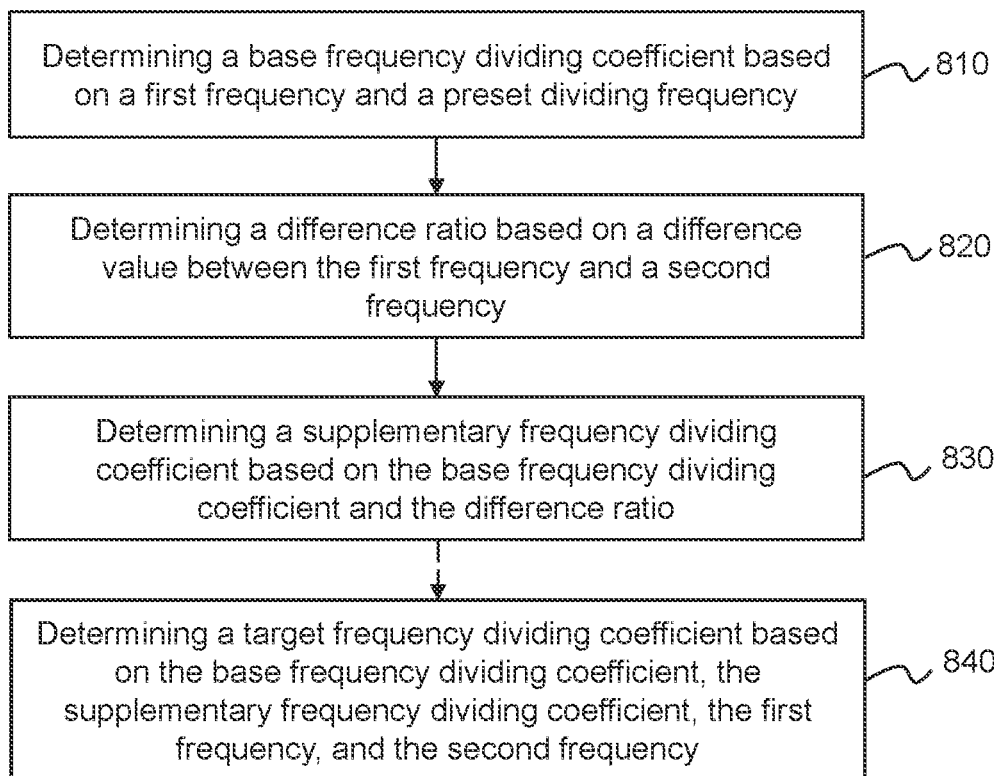

Determining a base frequency dividing coefficient based on a first frequency and a preset dividing frequency — 810

Determining a difference ratio based on a difference value between the first frequency and a second frequency — 820

Determining a supplementary frequency dividing coefficient based on the base frequency dividing coefficient and the difference ratio — 830

Determining a target frequency dividing coefficient based on the base frequency dividing coefficient, the supplementary frequency dividing coefficient, the first frequency, and the second frequency — 840

| Head | Type | Camera ID | Data content of message | Check Code |

SYSTEMS AND METHODS FOR CAMERA SYNCHRONIZATION

CROSS-REFERENCE TO RELATED APPLICATIONS

This application is a Continuation of International Application No. PCT/CN2022/104126, filed on Jul. 6, 2022, which claims priority of Chinese Patent Application No. 202110769848.0 filed on Jul. 8, 2021, the contents of each of which are incorporated herein by reference in their entirety.

TECHNICAL FIELD

The present disclosure generally relates to communication technologies, and in particular, to systems and methods for camera synchronization.

BACKGROUND

In the field of machine vision, application scenarios in which a plurality of cameras are synchronously triggered to take images or cooperate with each other are very common. For the existing trigger instruction-based trigger manners, network jitter or delay fluctuation of instructions parsed by cameras may make it difficult for the plurality of cameras to achieve synchronized operation. In addition, if a signal line trigger manner is used, since system clocks of the plurality of cameras are generally different due to the difference among the plurality of cameras themselves, time stamps of data frames output from the plurality of cameras can't be accurately synchronized with internal data. Therefore, it is desirable to provide accurate systems and methods for camera synchronization, thereby achieving accurate cooperation among cameras.

SUMMARY

According to an aspect of the present disclosure, a system for camera synchronization may be provided. The system may include at least one storage medium including a set of instructions, and at least one processor in communication with the at least one storage medium. When executing the set of instructions, the at least one processor may be directed to cause the system to perform operations. The operations may include determining a frequency difference between a first frequency of a first camera and a second frequency of a second camera. The operations may also include synchronizing the second frequency of the second camera to the first frequency of the first camera based on the frequency difference. The operations may further include directing the first camera and the second camera to execute camera operations under synchronized frequency.

In some embodiments, the determining a frequency difference between a first frequency of a first camera and a second frequency of a second camera may include determining a first time of the first camera sending a message and a second time of the second camera receiving the message, determining a third time of the first camera sending a message and a fourth time of the second camera receiving the message, and determining the frequency difference based on the first time, the second time, the third time, and the fourth time.

In some embodiments, a format of the message at least may include camera ID. The first time or the third time may be a time point of the first camera sending a first camera ID of the first camera. The second time or the fourth time may be a time point of the second camera receiving the first camera ID.

In some embodiments, the synchronizing a second frequency of the second camera to a first frequency of the first camera based on the frequency difference may include synchronizing the second frequency of the second camera to the first frequency of the first camera based on the frequency difference and a preset dividing frequency.

In some embodiments, the synchronizing the second frequency of the second camera to the first frequency of the first camera based on the frequency difference and a preset dividing frequency may include dividing the second frequency of the second camera to the preset dividing frequency based on a target frequency dividing coefficient of the second camera, and multiplying the preset dividing frequency to the first frequency of the first camera.

In some embodiments, the determining the target frequency dividing coefficient may include determining a base frequency dividing coefficient based on the first frequency and the preset dividing frequency, determining a difference ratio based on a difference value between the first frequency and the second frequency, determining a supplementary frequency dividing coefficient based on the base frequency dividing coefficient and the difference ratio, and determining the target frequency dividing coefficient based on the base frequency dividing coefficient and the supplementary frequency dividing coefficient.

In some embodiments, the operations may further include determining a time difference between a first time of the first camera and a second time of the second camera under the synchronized frequency, and synchronizing the second time of the second camera to the first time of the first camera based on the time difference.

In some embodiments, the determining the time difference between the first time of the first camera and the second time of the second camera under the synchronized frequency may include determining a fifth time of the second camera sending a message and a sixth time of the first camera receiving the message, determining a seventh time of the first camera sending a message and an eighth time of the second camera receiving the message, and determining the time difference based on the fifth time, the sixth time, the seventh time, and the eighth time.

In some embodiments, the operations may further include receiving a trigger instruction. The operations may also include detecting a current time of the first camera and a current time of the second camera based on the trigger instruction. The operations may also include determining whether the current time of the first camera and the current time of the second camera satisfy a preset condition. In response to a determination that the current time of the first camera and the current time of the second camera satisfy the preset condition, the operations may include directing the first camera and the second camera to execute the camera operations.

In some embodiments, the first camera may be connected to the second camera via a camera pin, a bus, or a network interface.

According to another aspect of the present disclosure, a method for camera synchronization may be provided. The method may include determining a frequency difference between a first frequency of a first camera and a second frequency of a second camera. The method may also include synchronizing the second frequency of the second camera to the first frequency of the first camera based on the frequency difference. The method may further include directing the first camera and the second camera to execute camera operations under synchronized frequency.

According to another aspect of the present disclosure, a non-transitory computer readable medium may be provided. The non-transitory computer readable medium may include at least one set of instructions. When executed by one or more processors of a computing device, the at least one set of instructions may cause the computing device to perform a method. The method may include determining a frequency difference between a first frequency of a first camera and a second frequency of a second camera. The method may also include synchronizing the second frequency of the second camera to the first frequency of the first camera based on the frequency difference. The method may further include directing the first camera and the second camera to execute camera operations under synchronized frequency.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a block diagram illustrating an exemplary processing device according to some embodiments of the present disclosure;

FIG. 8 is a flowchart illustrating an exemplary process for determining a target frequency dividing coefficient according to some embodiments of the present disclosure;

FIG. 11 is a schematic diagram illustrating an exemplary format of a message according to some embodiments of the present disclosure.

DETAILED DESCRIPTION

Figure 1:
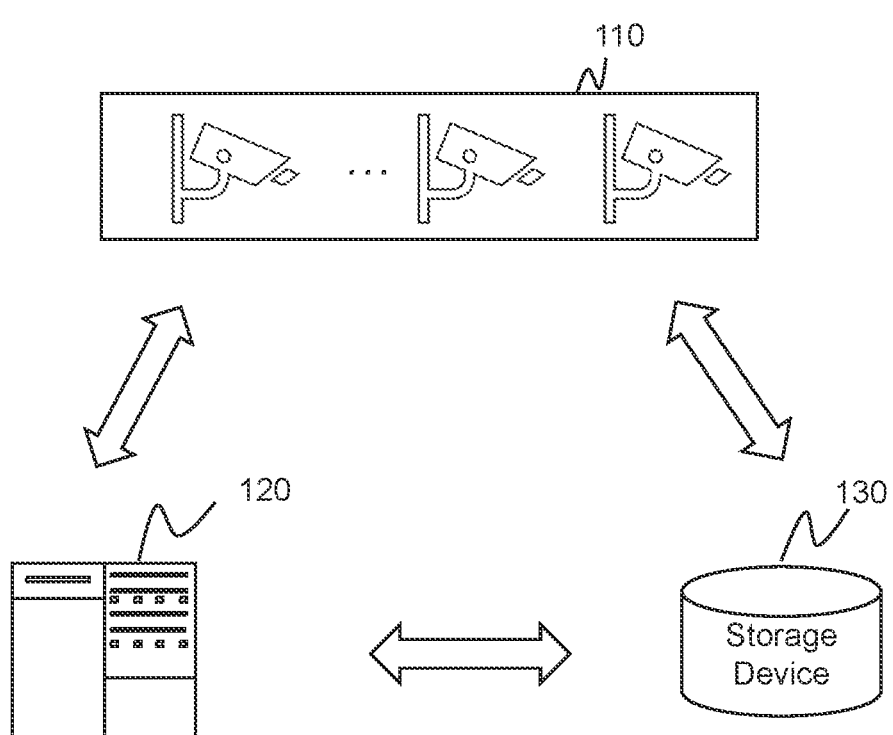
FIG. 1 is a schematic diagram illustrating an exemplary camera synchronization system according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to systems and methods for camera synchronization. The systems may determine a frequency difference between a first frequency of a first camera and a second frequency of a second camera. The systems may also synchronize the second frequency of the second camera to the first frequency of the first camera based on the frequency difference. Further, the systems may direct the first camera and the second camera to execute camera operations under synchronized frequency. The systems may also determine a time difference between a first time of the first camera and a second time of the second camera under the synchronized frequency, and synchronize the second time of the second camera to the first time of the first camera based on the time difference.

According to the systems and methods of the present disclosure, frequency synchronization and/or time synchronization among a plurality of cameras can be achieved, so that timestamps of data frames output by the plurality of cameras can be completely synchronized with internal data, thereby achieving accurate and efficient cooperation among the plurality of cameras.

FIG. 1 is a schematic diagram illustrating an exemplary camera synchronization system according to some embodiments of the present disclosure. As shown, the camera synchronization system 100 may include a multi-camera device 110, a processing device 120, and a storage device 130. In some embodiments, the multi-camera device 110, the processing device 120, and/or the storage device 130 may be connected to and/or communicate with each other via a wireless connection (e.g., a network), a wired connection, or a combination thereof. The connection between the components in the camera synchronization system 100 may be variable. Merely by way of example, the multi-camera device 110 may be connected to the processing device 120 directly as illustrated in FIG. 1 or through a network. As another example, the storage device 130 may be connected to the processing device 120 directly as illustrated in FIG. 1 or through a network.

The multi-camera device 110 may be configured to capture images or videos. In some embodiments, the multi-camera device 110 may include a plurality of cameras. In some embodiments, the plurality of cameras may be directed to execute camera operations synchronously. Exemplary cameras may include a gun camera, a dome camera, an integrated camera, a monocular camera, a binocular camera, a multi-view camera, a visible light camera, a thermal imaging camera, or the like, or any combination thereof. In some embodiments, the multi-camera device 110 may transmit the captured images or videos to one or more components (e.g., the processing device 120, the storage device 130) of the camera synchronization system 100.

The processing device 120 may process data and/or information obtained from one or more components (e.g., the multi-camera device 110 and/or the storage device 130) of the camera synchronization system 100. For example, the processing device 120 may synchronize frequencies and/or times of the cameras of the multi-camera device. Further, the systems may direct the cameras to execute camera operations under synchronized frequency and/or synchronized time. As another example, the processing device 120 may determine a target frequency dividing coefficient and execute frequency synchronization based on the target frequency dividing coefficient. In some embodiments, the processing device 120 may be a single server or a server group. The server group may be centralized or distributed. In some embodiments, the processing device 120 may be local or remote. For example, the processing device 120 may access information and/or data stored in the multi-camera device 110 and/or the storage device 130. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 illustrated in FIG. 2.

The storage device 130 may store data/information obtained from the multi-camera device 110 and/or any other component of the camera synchronization system 100. In some embodiments, the storage device 130 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. In some embodiments, the storage device 130 may store one or more programs and/or instructions to perform exemplary methods described in the present disclosure.

In some embodiments, the storage device 130 may be communicated with one or more other components (e.g., the multi-camera device 110, the processing device 120) of the camera synchronization system 100. One or more components of the camera synchronization system 100 may access the data or instructions stored in the storage device 130. In some embodiments, the storage device 130 may be part of the processing device 120.

In some embodiments, the camera synchronization system 100 may further include a network. The network may facilitate exchange of information and/or data for the camera synchronization system 100. In some embodiments, one or more components (e.g., the multi-camera device 110, the processing device 120, the storage device 130) of the camera synchronization system 100 may transmit information and/or data to other component(s) of the camera synchronization system 100 via the network. In some embodiments, the network may be any type of wired or wireless network, or combination thereof.

In some embodiments, the camera synchronization system 100 may further a terminal device. The terminal device may be configured to receive information and/or data from the multi-camera device 110, the processing device 120, and/or the storage device 130. For example, the terminal device may receive the captured images or videos from the multi-camera device 110. In some embodiments, the terminal device may process information and/or data received from the multi-camera device 110, the processing device 120, and/or the storage device 130. In some embodiments, the terminal device may provide a user interface via which a user may view information and/or input data and/or instructions to the camera synchronization system 100. In some embodiments, the terminal device may include a mobile phone, a computer, a wearable device, or the like, or any combination thereof. In some embodiments, the terminal device may include a display that can display information in a human-readable form, such as text, image, audio, video, graph, animation, or the like, or any combination thereof. The display of the terminal device may include a cathode ray tube (CRT) display, a liquid crystal display (LCD), a light-emitting diode (LED) display, a plasma display panel (PDP), a three-dimensional (3D) display, or the like, or a combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
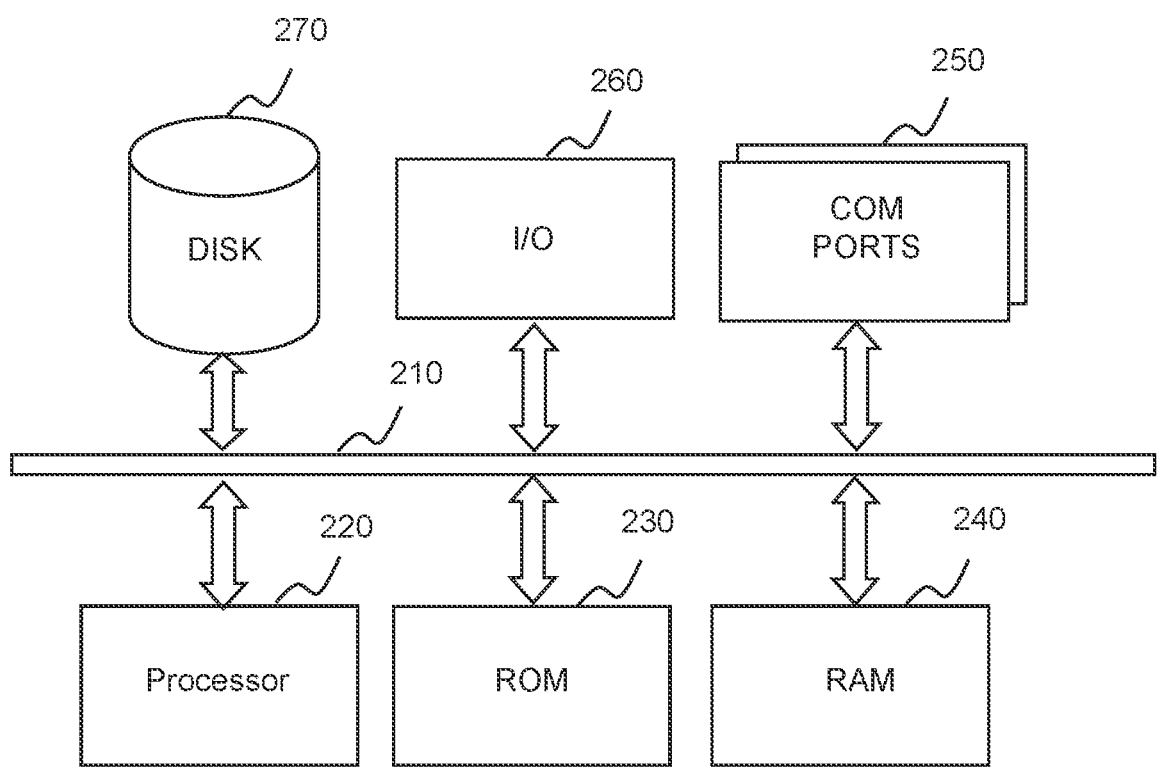
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the processing device 120 may be implemented on the computing device 200 and configured to perform functions of the processing device 120 disclosed in this disclosure.

In some embodiments, the computing device 200 may be used to implement any component of the camera synchronization system 100 as described herein. For example, the processing device 120 may be implemented on the computing device 200, via its hardware, software program, firmware, or a combination thereof. Although only one such computer is shown, for convenience, the computer functions relating to camera synchronization as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., a processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read-only memory (ROM) 230, or a random-access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computing device 200 and other components. The computing device 200 may also receive programming and data via network communications. Merely for illustration, only one processor is illustrated in FIG. 2. Multiple processors 220 are also contemplated; thus, operations and/or method steps performed by one processor 220 as described in the present disclosure may also be jointly or separately performed by the multiple processors.

Figure 3:
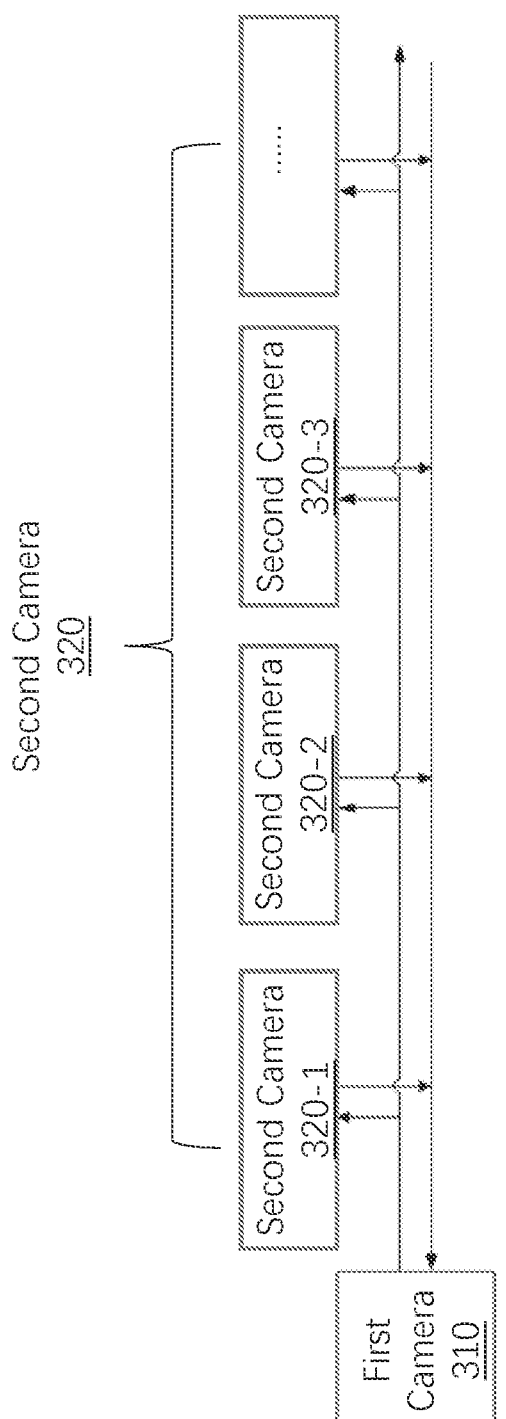
FIG. 3 is a schematic diagram illustrating an exemplary multi-camera device according to some embodiments of the present disclosure.

FIG. 3 is a schematic diagram illustrating an exemplary multi-camera device according to some embodiments of the present disclosure.

As illustrated in FIG. 3, the multi-camera device 300 may include a first camera 310, a second camera 320-1, a second camera 320-2, a second camera 320-3, . . . . In some embodiments, the multi-camera device 110 may be in a one-master-multi-slave mode. In some embodiments, the first camera 310 may be designated as the master device, and the second camera 320 (e.g., the second camera 320-1, the second camera 320-2, the second camera 320-3) may be designated as the slave device.

In some embodiments, the first camera 310 may be in communication with the second camera 320 via a camera pin, a bus (e.g., I2C bus), a network interface, or the like, or a combination thereof.

In some embodiments, the first camera 310 and the second camera 320 may interact via message. More descriptions regarding the message may be found elsewhere in the present disclosure, for example, FIG. 11 and relevant descriptions thereof.

FIG. 4 is a block diagram illustrating an exemplary processing device according to some embodiments of the present disclosure.

As illustrated in FIG. 4, the processing device 400 may include a frequency determination module 410, a frequency synchronization module 420, and a trigger module 430.

The frequency determination module 410 may be used to determine a frequency difference between a first frequency of a first camera and a second frequency of a second camera. More descriptions regarding the frequency determination module 410 may be found elsewhere in the present disclosure, for example, operation 510 and relevant descriptions thereof.

The frequency synchronization module 420 may be used to synchronize the second frequency of the second camera to the first frequency of the first camera based on the frequency difference. More descriptions regarding the frequency synchronization module 420 may be found elsewhere in the present disclosure, for example, operation 520 and relevant descriptions thereof.

The trigger module 430 may be used to direct the first camera and the second camera to execute camera operations under synchronized frequency. More descriptions regarding the trigger module 430 may be found elsewhere in the present disclosure, for example, operation 530 and relevant descriptions thereof.

In some embodiments, the processing device 120 may further include a time determination module 440 and a time synchronization module 450.

The time determination module 440 may be used to determine a time difference between a first time of the first camera and a second time of the second camera under the synchronized frequency. More descriptions regarding the time determination module 440 may be found elsewhere in the present disclosure, for example, operation 540 and relevant descriptions thereof.

The time synchronization module 450 may be used to synchronize the second time of the second camera to the first time of the first camera based on the time difference. More descriptions regarding the time synchronization module 450 may be found elsewhere in the present disclosure, for example, operation 550 and relevant descriptions thereof.

The modules in the processing device 120 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

In some embodiments, the time determination module 440 and the time synchronization module 450 may be unnecessary.

In some embodiments, two or more of the modules may be combined as a single module, and any one of the modules may be divided into two or more units. For example, the frequency determination module 410 and the time determination module 440 may be combined as a single module which may both determine the frequency difference and the time difference between the first camera and the second camera.

In some embodiments, the processing device 120 may include one or more additional modules. For example, the processing device 120 may also include a transmission module (not shown) configured to transmit signals (e.g., electrical signals, electromagnetic signals) to one or more components (e.g., the multi-camera device 110, the storage device 130) of the camera synchronization system 100. As another example, the processing device 120 may include a storage module (not shown) used to store information and/or data (e.g., the frequency difference, the time difference, the camera ID) associated with camera synchronization.

Figure 5A:
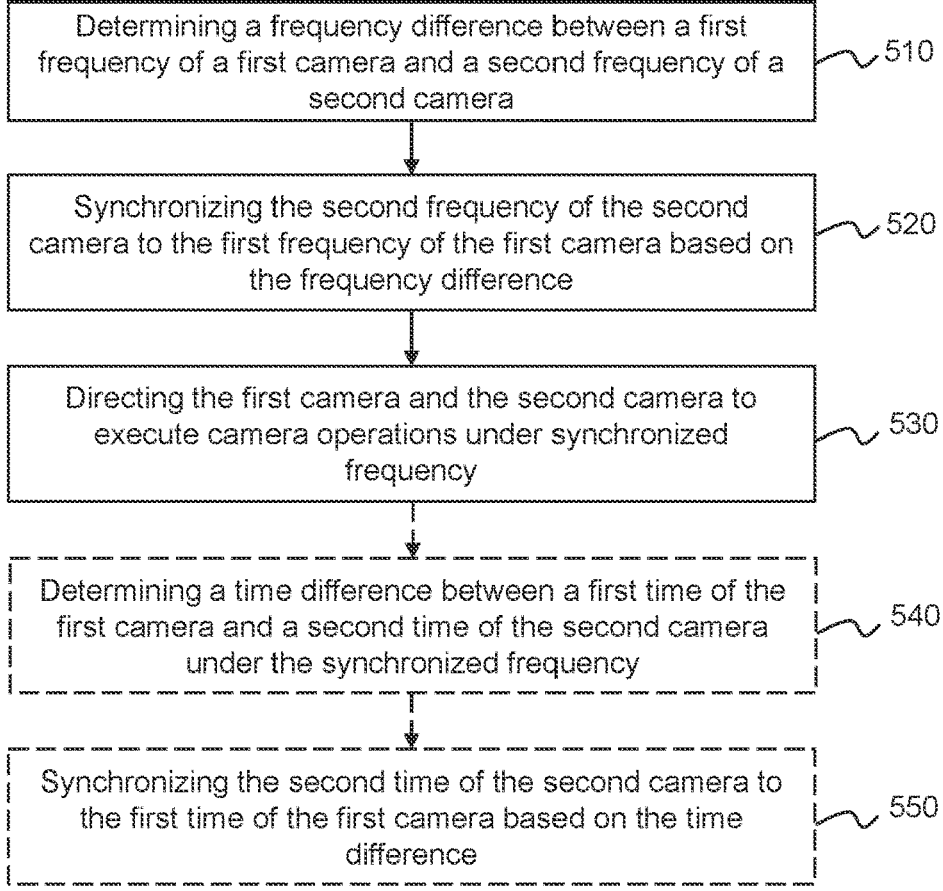
FIG. 5A is a flowchart illustrating an exemplary process for camera synchronization according to some embodiments of the present disclosure.

FIG. 5A is a flowchart illustrating an exemplary process for camera synchronization according to some embodiments of the present disclosure. In some embodiments, process 500 may be executed by the camera synchronization system 100. For example, the process 500 may be implemented as a set of instructions (e.g., an application) stored in a storage device (e.g., the storage device 130). In some embodiments, the processing device 120 (e.g., the processor 220 of the computing device 200 and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5A and described below is not intended to be limiting.

In 510, the processing device 120 (e.g., the frequency determination module 410) may determine a frequency difference between a first frequency of a first camera (e.g., the first camera 310) and a second frequency of a second camera (e.g., the second camera 320).

In some embodiments, the first frequency may be a local clock frequency of the first camera; the second frequency may be a local clock frequency of the second camera. As described elsewhere in the present disclosure, since manufacturers, models or types of crystal oscillators, camera working conditions (e.g., temperature), or the like, are different, there may be frequency difference(s) among different cameras. Accordingly, the processing device 120 may determine frequency difference(s) among the different cameras and perform a frequency synchronization.

In some embodiments, as described elsewhere in the present disclosure, the first camera and the second camera may interact with each other via a message. Accordingly, the processing device 120 may determine the frequency difference between the first camera and the second camera based on a sending time and/or a receiving time of the message.

In some embodiments, a form of the frequency difference between the first camera and the second camera may include a frequency ratio, a frequency difference value, or the like, or any combination thereof. In some embodiments, the frequency difference between the first camera and the second camera may be represented as a numerical value, a vector, a matrix, a determinant, or the like, or a combination thereof.

Figure 6:
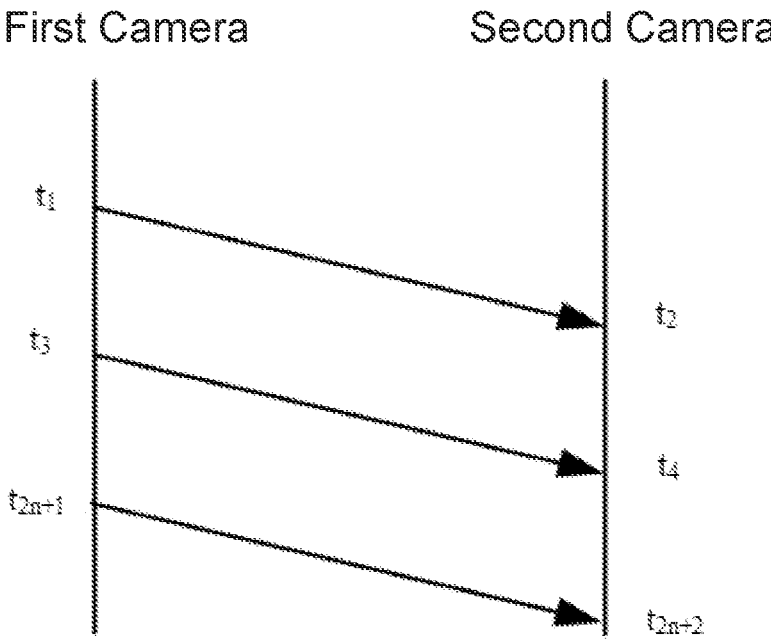
FIG. 6 is a schematic diagram illustrating an exemplary process for determining frequency difference according to some embodiments of the present disclosure.

In some embodiments, taking the "frequency ratio" as an example, the processing device 120 may determine a first time (e.g., $t_1$ shown in FIG. 6) of the first camera sending a message (can be referred to as a "first message") and a second time (e.g., $t_2$ shown in FIG. 6) of the second camera receiving the message. The processing device 120 may also determine a third time (e.g., $t_3$ shown in FIG. 6) of the first camera sending a message (can be referred to as a "second message"and a fourth time (e.g., $t_4$ shown in FIG. 6) of the second camera receiving the message. The processing device 120 may further determine the frequency difference between the first camera and the second camera based on the first time, the second time, the third time, and the fourth time.

For example, the processing device 120 may determine the frequency difference according to the following Equation (1):

$$\text{Ratio} = \frac{t_3 - t_1}{t_4 - t_2} \quad (1)$$

where ratio refers to the frequency difference (frequency ratio).

In some embodiments, the first message and the second message may be the same or different.

In some embodiments, the first camera may send more than two (e.g., 3, 5, 10) messages to the second camera. For example, the first camera may send a plurality of messages consecutively to the second camera. Accordingly, the processing device 120 may determine a time $t_{2n+1}$ of the first camera sending the message and a time $t_{2n+2}$ of the second camera receiving the message, respectively. The processing device 120 may further determine the frequency difference between the first camera and the second camera based on the sending times and receiving times of the plurality of messages.

For example, the processing device 120 may determine the frequency difference according to the following Equation (2):

$$\text{Ratio} = \frac{t_{2n+1} - t_1}{t_{2n+2} - t_2} = \frac{n * \Delta T}{t_{2n+2} - t_2} \quad (2)$$

where n refers to a count of the plurality of messages and $\Delta T$ refers to a time interval for sending the plurality of messages. In some embodiments, the time interval $\Delta T$ may be a system default value or set by a user. For example, The time interval $\Delta T$ may be 5 milliseconds, 20 milliseconds, 1 second, etc.

According to the plurality of messages sent consecutively, the frequency difference between the first camera and the second camera can be determined more accurately.

In some embodiments, a format of the message may at least include a camera ID. Accordingly, the time sending and/or receiving the message may be determined based on the camera ID. In some embodiments, the camera ID may include a camera number, a serial number, an International Mobile Equipment Identity, or the like, or any combination thereof. For example, the first time or the third time may be a time point of the first camera sending a first camera ID of the first camera, and the second time or the fourth time may be a time point of the second camera receiving the first camera ID. More descriptions regarding the format of the message may be found elsewhere in the present disclosure, for example, FIG. 11 and relevant descriptions thereof.

In 520, the processing device 120 (e.g., the frequency synchronization module 420) may synchronize the second frequency of the second camera to the first frequency of the first camera based on the frequency difference.

In some embodiments, the processing device 120 may adjust the second frequency of the second camera to the first frequency of the first camera based on the frequency difference. For example, the processing device 120 may adjust the second frequency of the second camera to the first frequency of the first camera according to the following Equation (3):

$$f_{osys} = \text{Ratio} * f_{osc} \quad (3)$$

where $f_{osys}$ refers to the first frequency (also referred to as a "target frequency"), fast refers to the second frequency, and Ratio refers to the frequency difference.

Figure 7:
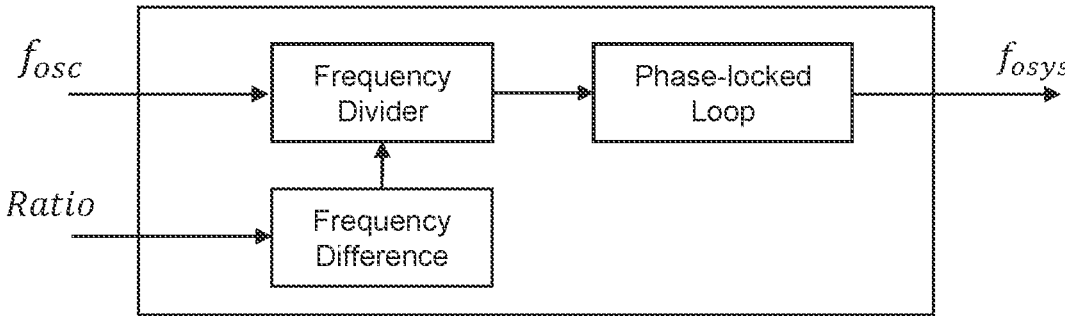
FIG. 7 is a schematic diagram illustrating an exemplary process for frequency synchronization according to some embodiments of the present disclosure.

In some embodiments, to improve the accuracy of frequency synchronization at relatively high frequencies, the processing device 120 may divide the second frequency of the second camera to a preset dividing frequency, and multiply the preset dividing frequency to the first frequency of the first camera. For example, as shown in FIG. 7, the processing device 120 may input the frequency difference and the second frequency to a frequency divider and divide the second frequency to the preset dividing frequency through the frequency divider. Then the processing device 120 may input the preset dividing frequency to a phase-locked loop to multiply the preset dividing frequency to the first frequency.

In some embodiments, the processing device 120 may divide the second frequency of the second camera to the preset dividing frequency based on a target frequency dividing coefficient, and then multiply the preset dividing frequency to the first frequency. In some embodiments, the processing device 120 may use a high-order overflow manner (e.g., a 14-bit high-order overflow manner) to divide the second frequency to the preset dividing frequency. More descriptions regarding determining the target frequency dividing coefficient may be found elsewhere in the present disclosure, for example, FIG. 8 and relevant descriptions thereof.

In some embodiments, the preset dividing frequency may be a frequency that is lower than the first frequency and that is divisible by the first frequency. For example, it is assumed that the first frequency is 100 MHz, the preset dividing frequency may be 10 MHz, 20 MHz, 25 Mhz, 50 MHz, etc. In some embodiments, the preset dividing frequency may be a system default value or set by a user.

In 530, the processing device 120 (e.g., the trigger module 430) may direct the first camera and the second camera to execute camera operations under synchronized frequency.

In some embodiments, after completing the frequency synchronization between the first camera and the second camera, the processing device 120 may control the first camera and the second camera to execute the camera operations (e.g., exposure, photography, shooting) under synchronized frequency. Since the first camera and the second camera work at the same frequency, the first camera and the second camera can achieve accurate cooperation with each other. More descriptions regarding executing the camera operations may be found elsewhere in the present disclosure, for example, FIG. 12 and relevant descriptions thereof.

In some embodiments, after completing the frequency synchronization of the first camera and the second camera, the processing device 120 may also execute a time synchronization between the first camera and the second camera to further enhance the accuracy of the cooperation.

In 540, the processing device 120 (e.g., the time determination module 440) may determine a time difference between a first time of the first camera and a second time of the second camera under the synchronized frequency.

In some embodiments, the first time may be a local current time point of the first camera; the second time may be a local current time point of the second camera.

In some embodiments, as described elsewhere in the present disclosure, the first camera and the second camera may interact with each other via a message. Accordingly, the processing device 120 may determine the time difference between the first camera and the second camera based on the sending time and/or the receiving time of the message.

In some embodiments, a form of the time difference between the first camera and the second camera may include a time ratio, a time difference value, or the like, or any combination thereof. In some embodiments, the time difference between the first camera and the second camera may be represented as a numerical value, a vector, a matrix, a determinant, or the like, or any combination thereof.

Figure 9:
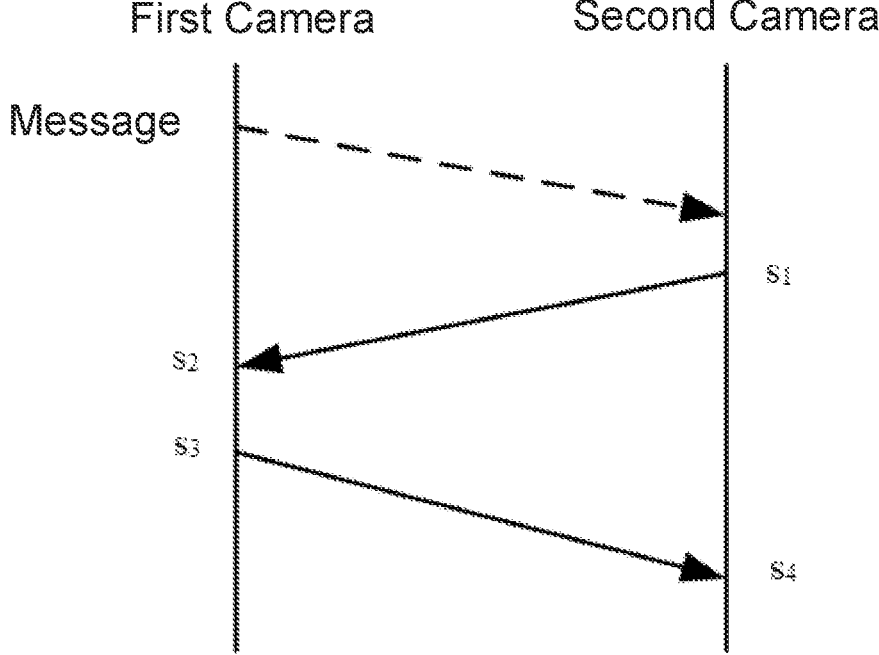
FIG. 9 is a schematic diagram illustrating an exemplary process for determining time difference according to some embodiments of the present disclosure.

In some embodiments, taking the "time difference value" as an example, the processing device 120 may determine a fifth time (e.g., $s_1$ shown in FIG. 9) of the second camera sending a message (can be referred to as a "third message") and a sixth time (e.g., $s_2$ shown in FIG. 9) of the first camera receiving the message. The processing device 120 may also determine a seventh time (e.g., $s_3$ shown in FIG. 9) of the first camera sending a message (can be referred to as a "fourth message") and an eighth time (e.g., $s_4$ shown in FIG. 9) of the second camera receiving the message. The processing device 120 may further determine the time difference between the first camera and the second camera based on the fifth time, the sixth time, the seventh time, and the eighth time.

For example, the processing device 120 may determine the time difference according to the following Equation (4):

$$d = \frac{(s_2 + s_4) - (s_1 + s_3)}{2} \tag{4}$$

where d refers to the time difference (time difference value).

In 550, the processing device 120 (e.g., the time synchronization module 450) may synchronize the second time of the second camera to the first time of the first camera based on the time difference.

Figure 10:
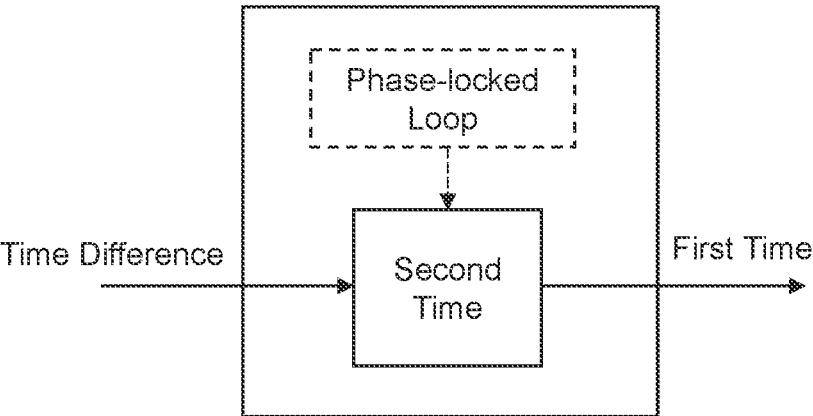
FIG. 10 is a schematic diagram illustrating an exemplary process for time synchronization according to some embodiments of the present disclosure.

In some embodiments, the processing device 120 may modify the second time of the second camera to the first time of the first camera based on the time difference to achieve the time synchronization between the first camera and the second camera. For example, as shown in FIG. 10, the processing device 120 may determine a time adjustment amount for the second camera based on the time difference and accumulate the time adjustment amount to a system time adjustment module of the second camera, thereby modifying the second time of the second camera to the first time.

In some embodiments, after completing the frequency synchronization and the time synchronization between the first camera and the second camera, the processing device 120 may control the first camera and the second camera to execute the camera operations. Since the first camera and the second camera work at the same frequency and the same time, the synchronization of the operations of the first camera and the second camera can be strictly and accurately guaranteed, thereby ensuring accurate cooperation between the first camera and the second camera. More descriptions regarding executing the camera operations may be found elsewhere in the present disclosure, for example, FIG. 12 and relevant descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

For example, one or more other optional operations (e.g., a storing operation, a transmitting operation) may be added elsewhere in the process 500. In the storing operation, the processing device 120 may store information and/or data (e.g., the camera ID, the frequency difference, the time difference) associated with the camera synchronization in a storage device (e.g., the storage device 130) disclosed elsewhere in the present disclosure. In the transmitting operation, the camera (e.g., the first camera or the second camera) may transmit the time sending or receiving a message to the processing device 120. As another example, operation 510 and operation 540 may be combined into a single operation in which the processing device 120 may determine the frequency difference and the time difference between the first camera and the second camera. As a further example, operation 540 and operation 550 may be unnecessary.

Figure 5B:
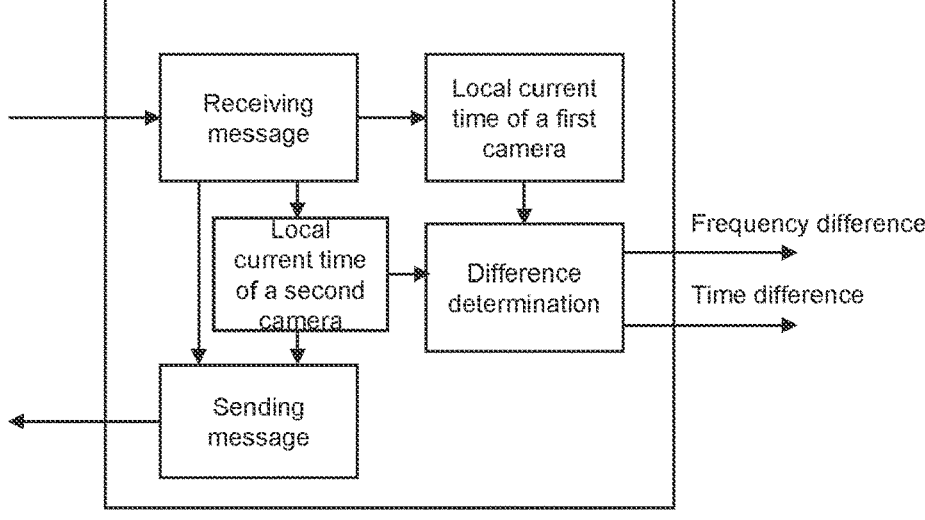
FIG. 5B is a schematic diagram illustrating an exemplary process for camera synchronization according to some embodiments of the present disclosure.

FIG. 5B is a schematic diagram illustrating an exemplary process for camera synchronization according to some embodiments of the present disclosure. As shown in FIG. 5B, the first camera and the second camera may interact with each other by sending a message and/or receiving a message. The processing device 120 may determine the frequency difference and the time difference between the first camera and the second camera based on a first time (also referred to as a "local current time") of the first camera and a second time (also referred to as a "local current time") of the second camera when sending and/or receiving the message. The processing device 120 may further perform the frequency synchronization and the time synchronization between the first camera and the second camera based on the frequency difference and the time difference.

FIG. 8 is a flowchart illustrating an exemplary process for determining a target frequency dividing coefficient according to some embodiments of the present disclosure. In some embodiments, process 800 may be executed by the camera synchronization system 100. For example, the process 800 may be implemented as a set of instructions (e.g., an application) stored in a storage device (e.g., the storage device 130). In some embodiments, the processing device 120 (e.g., the processor 220 of the computing device 200 and/or the frequency synchronization module 420) may execute the set of instructions and may accordingly be directed to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device (e.g., the frequency synchronization module 420) may determine a base frequency dividing coefficient based on the first frequency and the preset dividing frequency.

In some embodiments, the processing device 120 may determine the base frequency dividing coefficient based on a ratio of the first frequency to the preset dividing frequency. For example, it is assumed that the first frequency is 100 MHz and the preset dividing frequency is 25 MHz, the base frequency dividing coefficient may be 4. As another example, it is assumed that the first frequency is 200 MHz and the preset dividing frequency is 20 MHz, the base frequency dividing coefficient may be 10.

In some embodiments, as described in connection with operation 520, the processing device 120 may use a high-order overflow manner (e.g., a 14-bit high-order overflow manner) to divide the second frequency of the second camera to the preset dividing frequency. For example, it is also assumed that the first frequency is 100 MHz and the preset dividing frequency is 25 MHz, the base frequency dividing coefficient (also can be expressed as "OSC_BASE") may be set as $4 \times 2^4 = 4096 = 0 \times 1000$ under a hexadecimal system.

In 820, the processing device 120 (e.g., the frequency synchronization module 420) may determine a difference ratio based on a difference value between the first frequency and the second frequency.

In some embodiments, the processing device 120 may determine the difference ratio based on a ratio of the difference value between the first frequency and the second frequency to the first frequency. For example, it is assumed that the first frequency is 100 MHz and the second frequency is 99 MHz, the difference ratio may be 0.01. As another example, it is assumed that the first frequency is 200 MHz and the second frequency is 212 MHz, the difference ratio may be 0.06.

In some embodiments, the difference ratio may be a positive value or a negative value. For example, if the first frequency is greater than the second frequency, the difference ratio may be a positive value. As another example, if the first frequency is less than the second frequency, the difference ratio may be a negative value. For example, it is assumed that the first frequency is 200 MHz and the second frequency is 212 MHz, the difference ratio may be −0.06.

In 830, the processing device 120 (e.g., the frequency synchronization module 420) may determine a supplementary frequency dividing coefficient based on the base frequency dividing coefficient and the difference ratio.

In some embodiments, the processing device 120 may determine the supplementary frequency dividing coefficient based on a product of the base frequency dividing coefficient and the difference ratio. For example, it is assumed that the base frequency dividing coefficient is 4 and the difference ratio is 0.01, the supplementary frequency dividing coefficient may be 0.04. As another example, it is assumed that the base frequency dividing coefficient is 10 and the difference ratio is 0.06, the supplementary frequency dividing coefficient may be 0.6.

In some embodiments, as described above, for the high-order overflow manner (e.g., a 14-bit high-order overflow manner), the processing device 120 may determine the supplementary frequency dividing coefficient (also can be expressed as "nanoseconds") based on a product of the difference ratio and the base frequency dividing coefficient (e.g., the "OSC_BASE"). For example, as described in connection with above, the supplementary frequency dividing coefficient may be set as $4096 \times 0.01 \approx 41 = 0 \times 029$ under the hexadecimal system.

In 840, the processing device 120 (e.g., the frequency synchronization module 420) may determine the target frequency dividing coefficient based on the base frequency dividing coefficient and the supplementary frequency dividing coefficient.

In some embodiments, the processing device 120 may determine the target frequency dividing coefficient based on a difference or a sum of the base frequency dividing coefficient and the supplementary frequency dividing coefficient. In some embodiments, if the first frequency is greater than the second frequency, the target frequency dividing coefficient may be determined based on the difference between the base frequency dividing coefficient and the supplementary frequency dividing coefficient. In some embodiments, if the first frequency is less than the second frequency, the target frequency dividing coefficient may be determined based on the sum of the base frequency dividing coefficient and the supplementary frequency dividing coefficient. In some embodiments, if the difference ratio is a negative value, the target frequency dividing coefficient may be determined based on the difference between the base frequency dividing coefficient and the supplementary frequency dividing coefficient.

For example, it is assumed that the base frequency dividing coefficient is 4 and the supplementary frequency dividing coefficient is 0.04, the target frequency dividing coefficient may be 3.96. As another example, it is assumed that the base frequency dividing coefficient is 10 and the supplementary frequency dividing coefficient is 0.6, the target frequency dividing coefficient may be 10.6.

In some embodiments, as shown in FIG. 7, the processing device 120 may add the frequency difference between the first camera and the second camera and the target frequency dividing coefficient to the frequency divider of the second camera. The frequency divider may divide the second frequency (e.g., 99 MHz) of the second camera to the preset dividing frequency (e.g., 25 MHz). The phase-locked loop module may multiply the preset dividing frequency to the first frequency (e.g., 100 MHz) of the first camera to realize the frequency synchronization between the second camera and the first camera.

In some embodiments, as described above, for the high-order overflow manner (e.g., a 14-bit high-order overflow manner), in order to eliminate or reduce error accumulation, the processing device 120 may determine a modification efficient (or a supplementary coefficient) per unit (e.g., a modification efficient per millisecond, can be expressed as "frac_ns"). Further, the processing device 120 may divide the second frequency of the second camera to the preset dividing frequency based on the base frequency dividing coefficient, the supplementary frequency dividing coefficient, and the modification efficient per unit. For example, the processing device 120 may add the base frequency dividing coefficient, the supplementary frequency dividing coefficient, and the modification efficient per unit to the frequency divider, and an overflow bit of the frequency divider may be determined as the preset dividing frequency.

In some embodiments, the processing device 120 may determine a count of clock cycles per unit (e.g., per millisecond) of the first frequency and a count of clock cycles per unit (e.g., per millisecond) of the second frequency, and determine the modification efficient per unit based on a difference between the two. For example, as described in connection with above, the base frequency dividing coefficient (e.g., the "OSC_BASE") is 4096, the supplementary frequency dividing coefficient (e.g., the "nanoseconds") is 41, the count of clock cycles per millisecond of the first frequency is $4096 \times 100$ Mhz$\times 0.001$ s=409600000, the count of clock cycles per millisecond of the second frequency is $(4096+41) \times 99$ Mhz$\times 0.001$ s=40956300. Accordingly, the modification efficient per unit is 409600000–40956300=37000=0x9088 under the hexadecimal system.

In the embodiments of the present disclosure, the frequency dividing process can be performed through a high-order overflow frequency dividing manner, and the supplementary frequency dividing coefficient is increased or decreased based on the base frequency dividing coefficient, accordingly, an accurate and convenient frequency dividing operation can be achieved, so that the accurate frequency synchronization can be realized.

Figure 11:
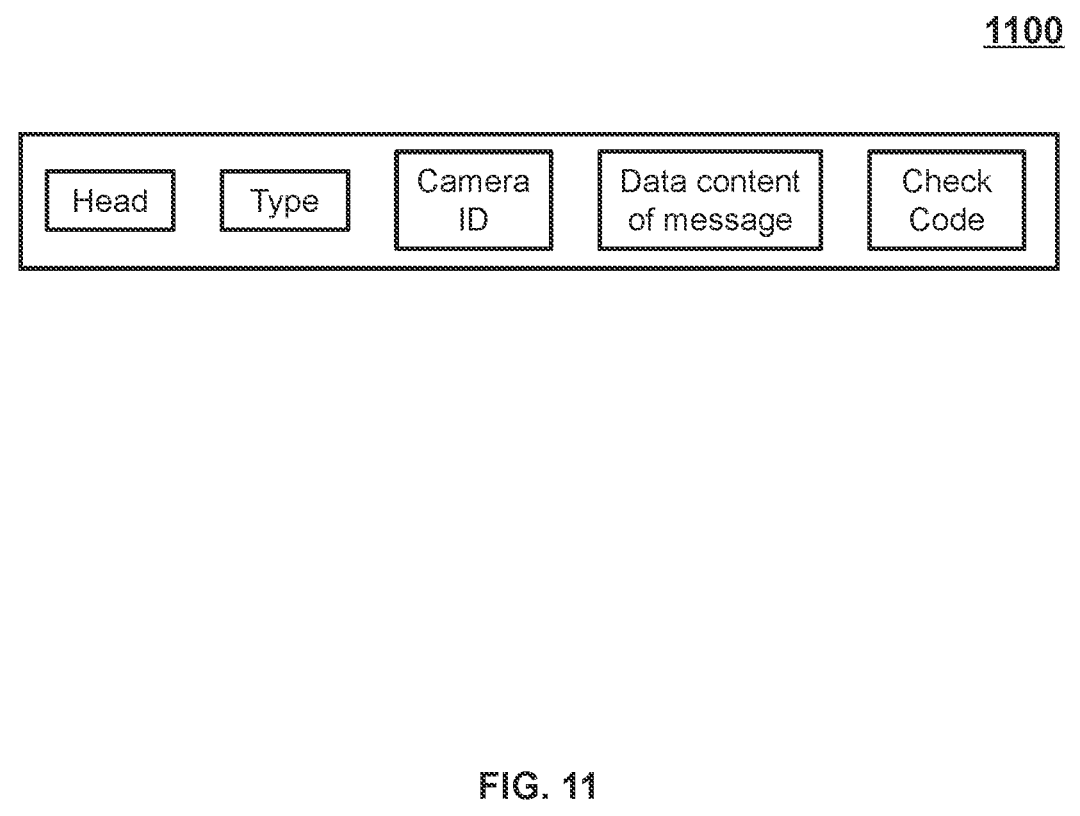

FIG. 11 is a schematic diagram illustrating an exemplary format of a message according to some embodiments of the present disclosure. As shown in FIG. 11, the format of the message 1100 may include a header, a type, a camera ID, content section (data content of the message), and a check code.

In some embodiments, the header may include a source port number, a destination port number, a length, or the like, or any combination thereof.

In some embodiments, the type may indicate a type of a data packet. An exemplary type may include a broadcast message (e.g., denoted by 0xFF), device synchronization (e.g., denoted by 0x01), device response (e.g., denoted by 0x02), time setting (e.g., denoted by 0x03), etc.

In some embodiments, the data content of the message may include a timestamp, a control instruction, data, or the like, or any combination thereof.

In some embodiments, the check code may be used to determine correctness of the data content of the message. In some embodiments, the check code may be a parity check, a Hemming code, a CRC cyclic redundancy check code, or the like, or a combination thereof.

In some embodiments, taking the data content of the message including the timestamp as an example, when the camera ID is sent by a data sender (e.g., the first camera), a local time (e.g., the first time) of the data sender may be locked and filled in a timestamp section. Similarly, a data receiver (e.g., the second camera) may perform the data reception in a similar manner. Accordingly, the interaction of local time information among a plurality of cameras can be achieved.

For example, as described in connection with operation 510, during a process of the second camera receiving a first message (e.g., a broadcast message) sent by the first camera, a synchronization data parsing unit of the second camera may parse the received first message. When the camera ID of the first camera is obtained, the second camera may obtain the local time $t_2$ (the second time) through a local time unit and send the local time $t_2$ to the processing device 120. Then the second camera may check the message after receiving the whole first message. If the check is verified, a time extraction unit of the first camera may extract the local time $t_1$ (the first time) of the first camera sending the first message and send the local time $t_1$ to the processing device 120. Similarly, during a process of the second camera receiving a second message sent by the first camera, the synchronization data parsing unit of the second camera may parse the received second message. When the first camera ID in the message is obtained, the second camera may obtain the local time $t_4$ (the fourth time) through the local time unit and send the local time $t_4$ to the processing device 120. Then the second camera may check the second message after receiving the whole second message. If the check is verified, the time extraction unit of the first camera may extract the local time $t_3$ (the third time) of the first camera sending the second message and send the local time $t_3$ to the processing device 120. Accordingly, the processing device 120 may determine the frequency difference between the first camera and the second camera according to the Equation (1) based on the first time, the second time, the third time, and the fourth time.

As another example, as described in connection with operation 540, after the second camera receives the broadcast message from the first camera, the second camera may send a third message (e.g., a synchronization message) to the first camera at the local time $s_1$ (the fifth time). The synchronization data parsing unit of the first camera may parse the received third message. When the camera ID of the second camera is obtained, the first camera may obtain the local time $s_2$ (the sixth time) through a local time unit and send the local time 52 to the processing device 120. Further, the first camera may send a fourth message to the second camera at the local time $s_3$ (the seventh time) of the first camera. During a process of the second camera receiving the fourth message, the second camera may parse the received fourth message. When the camera ID of the first camera is obtained, the second camera may obtain the local time $s_4$ (the eighth time) and send the local time s4 to the processing device 120. Accordingly, the processing device 120 may determine the time difference according to the Equation (4) based on the fifth time, the sixth time, the seventh time, and the eighth time.

Figure 12:
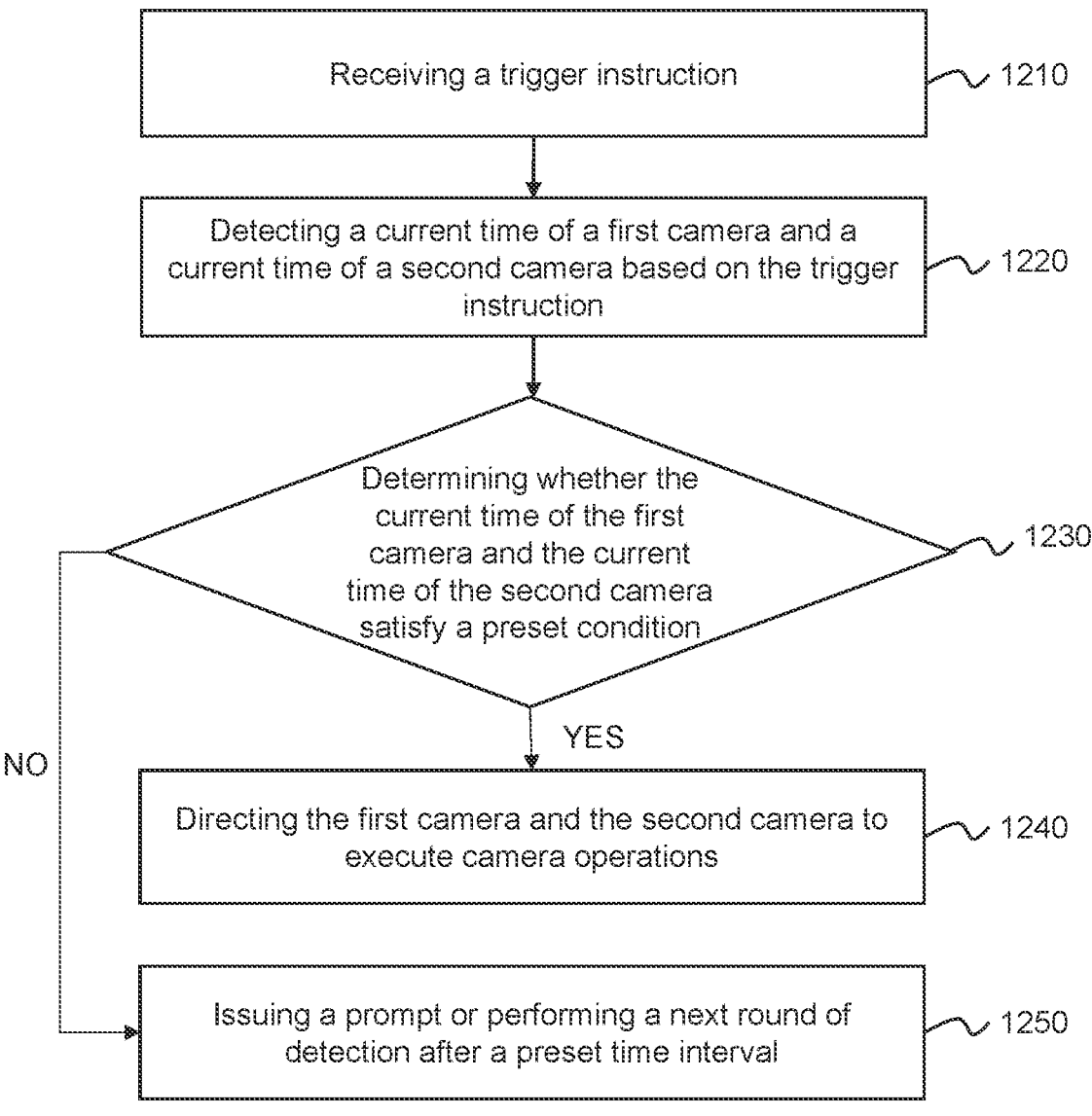
FIG. 12 is a flowchart illustrating an exemplary process for camera trigger according to some embodiments of the present disclosure.

FIG. 12 is a flowchart illustrating an exemplary process for camera trigger according to some embodiments of the present disclosure. In some embodiments, process 1200 may be executed by the camera synchronization system 100. For example, the process 1200 may be implemented as a set of instructions (e.g., an application) stored in a storage device (e.g., the storage device 130). In some embodiments, the processing device 120 (e.g., the processor 220 of the computing device 200 and/or the trigger module 430) may execute the set of instructions and may accordingly be directed to perform the process 1200. The operations of the illustrated process presented below are intended to be illustrative. In some embodiments, the process 1200 may be accomplished with one or more additional operations not described and/or without one or more of the operations discussed. Additionally, the order of the operations of process 1200 illustrated in FIG. 12 and described below is not intended to be limiting.

In 1210, the processing device 120 (e.g., the trigger module 430) may receive a trigger instruction.

In some embodiments, the trigger instruction may be used to instruct the camera to start or perform a corresponding operation.

In some embodiments, the trigger instruction may be a trigger instruction that is automatically sent when a trigger condition (e.g., a preset exposure time point, a preset capture time point) is satisfied as set by the system. In some embodiments, the trigger instruction may be a manually issued trigger instruction by the user. In some embodiments, the trigger instruction may be a trigger instruction sent by a superior device or an external device.

In 1220, the processing device 120 (e.g., the trigger module 430) may detect a current time of the first camera and a current time of the second camera based on the trigger instruction.

In some embodiments, after receiving the trigger instruction, the processing device 120 may instruct the first camera and the second camera to detect a respective current local time, respectively.

In 1230, the processing device 120 (e.g., the trigger module 430) may determine whether the current time of the first camera and the current time of the second camera satisfy a preset condition.

In some embodiments, the preset condition may be whether the current time of the first camera is the same as the current time of the second camera. In some embodiments, the preset condition may be whether the current time of the first camera and the current time of the second camera are a preset time point indicated in the trigger instruction (e.g., a preset exposure time point, a preset capture time point). In some embodiments, the preset condition may also include whether a clock frequency of the first camera and a clock frequency of the second camera have been synchronized.

In 1240, in response to a determination that the current time of the first camera and the current time of the second camera satisfy the preset condition, the processing device 120 (e.g., the trigger module 430) may direct the first camera and the second camera to execute the camera operations.

In some embodiments, the camera operations may include, for example, exposure, photography, shooting, or the like, or any combination thereof. Since the frequencies and the times of the first camera and the second camera are synchronized, the synchronous trigger of the cameras can be executed by means of time detection to realize the cooperation between the first camera and the second camera.

In 1250, in response to a determination that the current time of the first camera and the current time of the second camera do not satisfy the preset condition, the processing device 120 (e.g., the trigger module 430) may issue a prompt (e.g., a voice prompt, a text prompt, an image prompt) or perform a next round of detection after a preset time interval until the current time of the first camera and the current time of the second camera satisfy the preset condition.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A system, comprising:
at least one storage medium including a set of instructions; and
at least one processor in communication with the at least one storage medium, wherein when executing the set of instructions, the at least one processor is directed to cause the system to perform operations including:
determining a frequency difference between a first frequency of a first camera and a second frequency of a second camera;
synchronizing the second frequency of the second camera to the first frequency of the first camera based on the frequency difference by:

synchronizing the second frequency of the second camera to the first frequency of the first camera based on the frequency difference and a preset dividing frequency; and
directing the first camera and the second camera to execute camera operations under synchronized frequency.

2. The system of claim 1, wherein the determining a frequency difference between a first frequency of a first camera and a second frequency of a second camera includes:
determining a first time of the first camera sending a message and a second time of the second camera receiving the message;
determining a third time of the first camera sending a message and a fourth time of the second camera receiving the message; and
determining the frequency difference based on the first time, the second time, the third time, and the fourth time.

3. The system of claim 2, wherein a format of the message at least includes camera ID, wherein
the first time or the third time is a time point of the first camera sending a first camera ID of the first camera, and
the second time or the fourth time is a time point of the second camera receiving the first camera ID.

4. The system of claim 1, wherein the synchronizing the second frequency of the second camera to the first frequency of the first camera based on the frequency difference and a preset dividing frequency includes:
dividing the second frequency of the second camera to the preset dividing frequency based on a target frequency dividing coefficient of the second camera; and
multiplying the preset dividing frequency to the first frequency of the first camera.

5. The system of claim 4, wherein the determining the target frequency dividing coefficient includes:
determining a base frequency dividing coefficient based on the first frequency and the preset dividing frequency;
determining a difference ratio based on a difference value between the first frequency and the second frequency;
determining a supplementary frequency dividing coefficient based on the base frequency dividing coefficient and the difference ratio; and
determining the target frequency dividing coefficient based on the base frequency dividing coefficient and the supplementary frequency dividing coefficient.

6. The system of claim 1, the operations further including:
determining a time difference between a first time of the first camera and a second time of the second camera under the synchronized frequency; and
synchronizing the second time of the second camera to the first time of the first camera based on the time difference.

7. The system of claim 6, wherein the determining a time difference between a first time of the first camera and a second time of the second camera under the synchronized frequency includes:
determining a fifth time of the second camera sending a message and a sixth time of the first camera receiving the message;
determining a seventh time of the first camera sending a message and an eighth time of the second camera receiving the message; and
determining the time difference based on the fifth time, the sixth time, the seventh time, and the eighth time.

8. The system of claim 6, the operations further including:

receiving a trigger instruction;

detecting a current time of the first camera and a current time of the second camera based on the trigger instruction;

determining whether the current time of the first camera and the current time of the second camera satisfy a preset condition; and in response to a determination that the current time of the first camera and the current time of the second camera satisfy the preset condition, directing the first camera and the second camera to execute the camera operations.

9. The system of claim 1, wherein the first camera is connected to the second camera via a camera pin, a bus, or a network interface.

10. A method, comprising:

determining a frequency difference between a first frequency of a first camera and a second frequency of a second camera;

synchronizing the second frequency of the second camera to the first frequency of the first camera based on the frequency difference by:

synchronizing the second frequency of the second camera to the first frequency of the first camera based on the frequency difference and a preset dividing frequency; and directing the first camera and the second camera to execute camera operations under synchronized frequency.

11. The method of claim 10, wherein the determining a frequency difference between a first frequency of a first camera and a second frequency of a second camera includes:

determining a first time of the first camera sending a message and a second time of the second camera receiving the message;

determining a third time of the first camera sending a message and a fourth time of the second camera receiving the message; and determining the frequency difference based on the first time, the second time, the third time, and the fourth time.

12. The method of claim 11, wherein a format of the message at least includes camera ID, wherein the first time or the third time is a time point of the first camera sending a first camera ID of the first camera, and the second time or the fourth time is a time point of the second camera receiving the first camera ID.

13. The method of claim 10, wherein the synchronizing the second frequency of the second camera to the first frequency of the first camera based on the frequency difference and a preset dividing frequency includes:

dividing the second frequency of the second camera to the preset dividing frequency based on a target frequency dividing coefficient of the second camera; and multiplying the preset dividing frequency to the first frequency of the first camera.

14. The method of claim 13, wherein the determining the target frequency dividing coefficient includes:

determining a base frequency dividing coefficient based on the first frequency and the preset dividing frequency;

determining a difference ratio based on a difference value between the first frequency and the second frequency;

determining a supplementary frequency dividing coefficient based on the base frequency dividing coefficient and the difference ratio; and determining the target frequency dividing coefficient based on the base frequency dividing coefficient and the supplementary frequency dividing coefficient.

15. The method of claim 10, the operations further including:

determining a time difference between a first time of the first camera and a second time of the second camera under the synchronized frequency; and synchronizing the second time of the second camera to the first time of the first camera based on the time difference.

16. The method of claim 15, wherein the determining a time difference between a first time of the first camera and a second time of the second camera under the synchronized frequency includes:

determining a fifth time of the second camera sending a message and a sixth time of the first camera receiving the message;

determining a seventh time of the first camera sending a message and an eighth time of the second camera receiving the message; and determining the time difference based on the fifth time, the sixth time, the seventh time, and the eighth time.

17. The method of claim 15, the operations further including:

receiving a trigger instruction;

detecting a current time of the first camera and a current time of the second camera based on the trigger instruction;

determining whether the current time of the first camera and the current time of the second camera satisfy a preset condition; and in response to a determination that the current time of the first camera and the current time of the second camera satisfy the preset condition, directing the first camera and the second camera to execute the camera operations.

18. A non-transitory computer readable medium, comprising at least one set of instructions, wherein when executed by one or more processors of a computing device, the at least one set of instructions causes the computing device to perform a method, the method comprising:

determining a frequency difference between a first frequency of a first camera and a second frequency of a second camera;

synchronizing the second frequency of the second camera to the first frequency of the first camera based on the frequency difference by:

synchronizing the second frequency of the second camera to the first frequency of the first camera based on the frequency difference and a preset dividing frequency; and directing the first camera and the second camera to execute camera operations under synchronized frequency.

* * * * *